United States Patent
Billig et al.

(10) Patent No.: US 6,175,220 B1
(45) Date of Patent: Jan. 16, 2001

(54) SHORT-CIRCUIT PROTECTION FOR FORWARD-PHASE-CONTROL AC POWER CONTROLLER

(75) Inventors: Richard R. Billig, Los Gatos, CA (US); Steven B. Carlson, Portland, OR (US)

(73) Assignee: Power Innovations, Inc., Los Gatos, CA (US)

( * ) Notice: Under 35 U.S.C. 154(b), the term of this patent shall be extended for 0 days.

(21) Appl. No.: 09/425,504

(22) Filed: Oct. 22, 1999

(51) Int. Cl.[7] .................................................. G05F 1/10
(52) U.S. Cl. ............................................................ 323/239
(58) Field of Search .................................... 323/237, 235, 323/238, 239, 299, 300, 905, 241

(56) References Cited

U.S. PATENT DOCUMENTS 5,600,233 * 2/1997 Warren et al. ....................... 323/237

OTHER PUBLICATIONS

"BTA16–xxxSW BTB16–xxxSW High Performance Logic Level Triacs" STMicroelctronics Product Description, May, 1999, pp. 1–5.

Steven B. Carlson, "Testing IPS Dimmer Performance", Web Publication at www.rosco–et.com/Ipstest.htm, updated Nov. 12, 1996.

* cited by examiner

Primary Examiner—Peter S. Wong
Assistant Examiner—Gary L. Laxton
(74) Attorney, Agent, or Firm—Clifton L. Anderson

(57) ABSTRACT

A thyristor-based forward phase control (FPC) system for controlling the power delivered to a load from an AC power source employs a short-circuit test cycle to protect the thyristor from damage. Upon activation of the FPC system, the thyristor is triggered at a phase less than one-twelfth cycle before a zero crossing so that, if there is a short, the resulting peak current will be insufficient to damage the thyristor but will exceed a predetermined threshold current corresponding to a repetitive overload current. If during the test cycle, the threshold current value is crossed, the FPC system does not trigger the thyristor again and does indicate that a short exists. The threshold current value is selected to correspond to the thyristor's steady-state load rating. If it is exceeded during normal (including warm-up and request-based) operation, steps can be taken to address an overload condition. Accordingly, the same circuitry used for general overload protection can be used as well for short-circuit protection.

16 Claims, 4 Drawing Sheets

SHORT-CIRCUIT PROTECTION FOR FORWARD-PHASE-CONTROL AC POWER CONTROLLER

BACKGROUND OF THE INVENTION

The present invention relates to electronics and, more particularly, to phase-control systems for controlling the power delivered to a load. A major objective of the present invention is to provide for economical protection of a forward-phase-control dimmer or similar AC power controller from damage due to an overcurrent condition.

As the world's resources are being depleted, energy conservation increases in importance. One approach to conserving energy is to supply less power to a device than it is rated for when less than full power operation is required. For example, dimmers can be used to operate lights to provide only the light level desired at a given time. In contrast, on/off switches require that a light be operated only at its full rated power. Since dimmers not only save energy but also provide more control over the light level, they are generally more desirable than on/off switches. However, economic considerations at installation favor on/off switches.

The power from an AC power source delivered to a load can be controlled by selecting the portion (conduction angle) of an AC voltage half cycle that the AC power is coupled to the load. This power control technique is known as "phase control"—since power is coupled at one voltage phase angle and decoupled at another voltage phase angle. (See Phase Control Using Thyristors, Teccor Electronics, Inc., undated publication.)

"Forward-phase control" (FPC) involves coupling within a voltage half cycle and decoupling at the next zero crossing. The timing for the switching can be provided by a microcontroller or other timing device along with phase-tracking circuitry. The switching can be done using thyristors such as silicon-controlled rectifiers (SCRs) or triacs. A thyristor is activated by a trigger signal, and deactivated automatically at the next voltage zero crossing.

"Reverse-phase control" (RPC) involves coupling at a zero crossing and decoupling within the ensuing half voltage cycle. As with FPC, the timing for the phase control can be provided by a microcontroller. However, RPC is not implemented with thyristors since they cannot be easily or economically switched off by a signal at a control input. However, transistors, e.g., bipolar transistors, can be used as RPC current switches.

One advantage of RPC is the effectiveness with which overload protection can be implemented. The transistor is turned on when the voltage, and thus the current, is zero. The magnitude of the current can be monitored as it increases. If it approaches an overload threshold, the switch can be turned off before it is destroyed.

This monitoring approach is less applicable to thyristor-based FPC systems for two reasons. In the first place, the peak current is often (especially when the triggering is at or past a voltage peak) reached almost instantaneously, so there is little time to react before damage is done to the thyristor. In the second place, even if the damage can be anticipated, it is not in general possible to shut down a thyristor immediately; in general, a thyristor cannot be shut down until the next zero crossing. Thus, in a thyristor-based dimmer, overload protection typically does not begin until the next half-cycle. In many cases, the damage is already done.

Despite the problems with overload protection, FPC dimmers dominate the low-end of the dimmer market because they work with a wider variety of loads and because they cost less. FPC "dimmers" are better suited than are RPC dimmers for controlling inductive loads, such as fans and other motor-driven appliances. (Some systems test for inductive loads and select between FPC and RPC accordingly; see Steven B. Carlson, "Testing IPS Dimmer Performance", ROSCO/Entertainment Technology, 1996, published on the World-Wide Web.) Since the function performed by a single relatively inexpensive triac in an FPC system requires a pair of relatively expensive bipolar transistors in an RPC system, component costs favor FPC systems.

Because of the relatively low cost of FPC dimmers, replacement of wall switches with FPC dimmers is a popular "home-improvement" project. However, a significant percentage of non-professional installations establish an inadvertent short circuit between the load connection and AC neutral or protective earth ground. In other cases, an overload can be created when a device is added in parallel to a load already being driven using the dimmer. When a triac is activated in such cases, an excessive current can be generated that leaves the triac in a permanently conductive state. Often, the damaged dimmer is returned from the place of purchase. Such returns result in a cost that must be reflected in the original purchase price.

What is needed is a thyristor-based FPC system with more effective overload protection. In particular, it is desirable that an FPC system not be destroyed upon activation after an installation that establishes a short circuit. This more effective overload protection would reduce returns and thus the cost of dimmers. This would increase consumer satisfaction with such devices, and increase their prevalence. An increased prevalence of such dimmers would reduce energy consumption—benefiting both the user with reduced costs and society with the concomitant energy conservation.

SUMMARY OF THE INVENTION

The present invention provides for a series of one or more short-circuit-test voltage half cycles that begin upon activation of an FPC AC-power control system. These short-circuit-test half-cycles are used to determine whether a short circuit is indicated. If a short circuit is not indicated, the controller executes post-test (warm-up and/or requestresponsive) half-cycles. If a short circuit is indicated, the FPC system ceases to couple the load to power. While various types of switches can be used to control the coupling of a load to an AC power source, thyristors, such as triacs, are preferred.

For each test voltage half cycle, the thyristor is triggered at a phase selected so that the thyristor is not damaged in the event of a short. Such damage can be avoided by triggering the thyristor sufficiently after a peak of a voltage half-cycle has passed that the resulting peak current is within the thyristor's non-repetitive current handling capacity. Since peaks occur about one-quarter cycle before a zero crossing, a short-circuit test trigger should occur less than a quarter cycle, and preferably, less than a twelfth cycle (30°), before a zero crossing. Thus, the maximum current through the thyristor during a test half cycle can be arbitrarily below the peak current that would occur if the thyristor were on when the AC voltage peak occurs.

The value of a current parameter associated with the load current (which is the current through the short circuit itself in the event of a short circuit fault condition) can be compared with a "threshold value" during this short-circuit test cycle. In preferred realizations of the invention, the current parameter is current magnitude. An alternative current parameter is the magnitude of the rate of change of current. The case in which the current parameter is current itself is discussed immediately below, while the modifications required for the case in which the current parameter is the magnitude of the rate of change of current is discussed subsequently.

The current magnitude can be sensed as a voltage or as a function of a voltage across a sense resistor in series between power and the load. This "sense" voltage can be compared to a reference voltage, which corresponds to a threshold current value. For each test half cycle, a determination is made whether or not the load current exceeds the threshold value.

The determination of whether or not a short circuit is present is made as a function of one or more such threshold determinations. In the simplest case, there is one short-circuit-test half cycle and if the current threshold is exceeded for that test half cycle, then the FPC system ceases to couple the load to power. Otherwise, it proceeds to normal operation.

The challenge is to distinguish a short circuit from a cold load. A cold incandescent lamp draws about fifteen times the current it draws when warm. Thus, a 600-watt lamp, when cold, draws the current associated with a 9000-watt lamp. In other words, the 600-watt lamp can correspond to a resistance of about 25Ω when warm, but only 1.5Ω when cold. Fortunately, a short circuit in a structure using typical 12–14 AWG wire should represent a substantially lower resistance, e.g., about 0.5Ω. Thus, it is generally feasible to select a threshold value that can distinguish a true short circuit from a cold load.

In more complex embodiments, there can be multiple test half cycles; in that case the phase angles of the short-circuit-test triggers can be the same or can be varied in some manner. A short-circuit criterion is used to determine whether to shut down or proceed with normal cycles. If the threshold value is never exceeded, the FPC controller proceeds to normal operation. If the threshold current value is exceeded every short-circuit-test half cycle, the FPC controller shuts down. If the threshold value is exceeded in some test half cycles and not in others, the short-circuit criterion is embodiment-specific. Furthermore, a short-circuit criterion can take into account durations for which an overload is detected. These more complex embodiments allow some load warm up so that very large cold loads can be distinguished from shorts more reliably.

The short-circuit-test trigger phase and the sense resistor are co-selected to meet two criteria: 1) the thyristor current in the event of a short is not damaging; and 2) a short circuit can be distinguished from a large load. The latter criterion disfavors phase angles too near the zero-crossing. Thus, there can be a general tradeoff between a safe short-circuit current and the ability to distinguish a short circuit from a large load. However, there is generally plenty of latitude for meeting both criteria.

One reason for employing multiple short-circuit-test half cycles is that many load types, including incandescent lamps, increase in resistance as they heat up. Even if it is hard to distinguish a short from a large cold load, the distinction is rendered more easily as the load is operated. Multiple short-circuit cycles can be used to determine whether the current falls from cycle to cycle from above threshold to below threshold.

If the short-circuit criterion is not met, then the FPC controller proceeds to normal operation. Typically, an operator (human or otherwise) requests a certain power level or changes to a power level via an operator interface, e.g., a dial or buttons. During request-responsive operation, the FPC controller attempts to adjust the trigger phase angles so that the request is met. The adjustment can be nearly instantaneous (within one voltage cycle), or there can be a gradual transition in the direction of meeting a request.

There are a number of implementation aspects of the invention that provide for significant cost savings. For example, the current sense resistor can be a thin copper (or other conductive) trace, e.g., on a PCB board. This trace can be considerably less bulky and expensive than a stock resistor that can handle the desired load current. In addition, the overload detection is a binary determination. There is no need for a multi-bit analog-to-digital converter to monitor and integrate the current. To assess the extent of an overload excursion, the time the current threshold is exceeded can be measured.

Making a gradual transition from the short-circuit-test phase to a phase corresponding to an initially requested power level can be useful to allow a "cold" load to warm up. For example, the resistance of an incandescent lamp can be an order of magnitude less when it is cold (e.g., at turn on) than when it is hot (at thermal equilibrium after turn on). Thus, a lamp within a thyristor's overload specification can temporarily exceed that specification if turned on at full voltage when it is cold. A gradual "warm up" from a test phase angle to a high phase angle can reduce the chances of a damaging overload during normal operation. Also, in the case of an incandescent lamp load, the gradual transition reduces the likelihood of filament breakage due to a sudden current inrush. If an overload is detected during warm up, the trigger phase angle can be adjusted more gradually.

It is a feature of the invention that the sense resistor used for short-circuit protection can also be used for overload protection. Preferably, the threshold current is selected for detecting an overload condition during normal operation. The short-circuit-test trigger phase is then selected so that the threshold value is exceeded in the case of a short circuit, but not in the case of a cold load that will be within specification after warm up. While this approach exposes a thyristor to an overload current in the event of a short, a typical thyristor can withstand a substantial overload for a few cycles. The dual use of the overload circuitry is feasible using thyristors that have single-cycle surge ratings much greater than their steady-state current ratings.

While the foregoing focuses on cases in which the current parameter is current magnitude, the invention also provides for using other current parameters such as the magnitude of the rate of change of current. This parameter can be sensed as a voltage change across an inductance in series with the switch (and the load). Often, FPC power-control systems include an inductor as part of a RF filter to reduce high-frequency noise. This inductor can be used also as a sense inductor. The voltage across this inductor, or a voltage derived from this voltage, can be compared with a reference voltage to detect when a threshold current-rate-of-change value is exceeded. A short-circuit criterion is then based on such detections. Where current rate of change is the current parameter, a sense resistor can still be used to detect overload conditions after the short-circuit test is successfully completed.

Preferably, the power controller provides feedback for a user. For example, a short-circuit determination made during test half cycles can be indicated in one way, while an overload determination made during normal half-cycles can be indicated in another way. Such indications can aid the user and any support persons in diagnosing problematic operation of the FPC controller.

The present invention thus provides a short-circuit test to protect an FPC power controller from damage in the event of a short circuit. The components used for short-circuit protection can also be used for overload protection during post-short-circuit-test cycles-so the short-circuit protection is achieved with negligible additional production cost. However, the expected reduced incidence of controller failure and return can result in savings to sellers and their customers. As a result, the price of the power controllers can be reduced. In that case, price and failure rate are more favorable to the installation of power controllers. Thus, more devices can be operated at optimal rather than maximal levels. Accordingly, product satisfaction is greater while energy is conserved.

DESCRIPTION OF THE PREFERRED EMBODIMENTS

Figure 1:
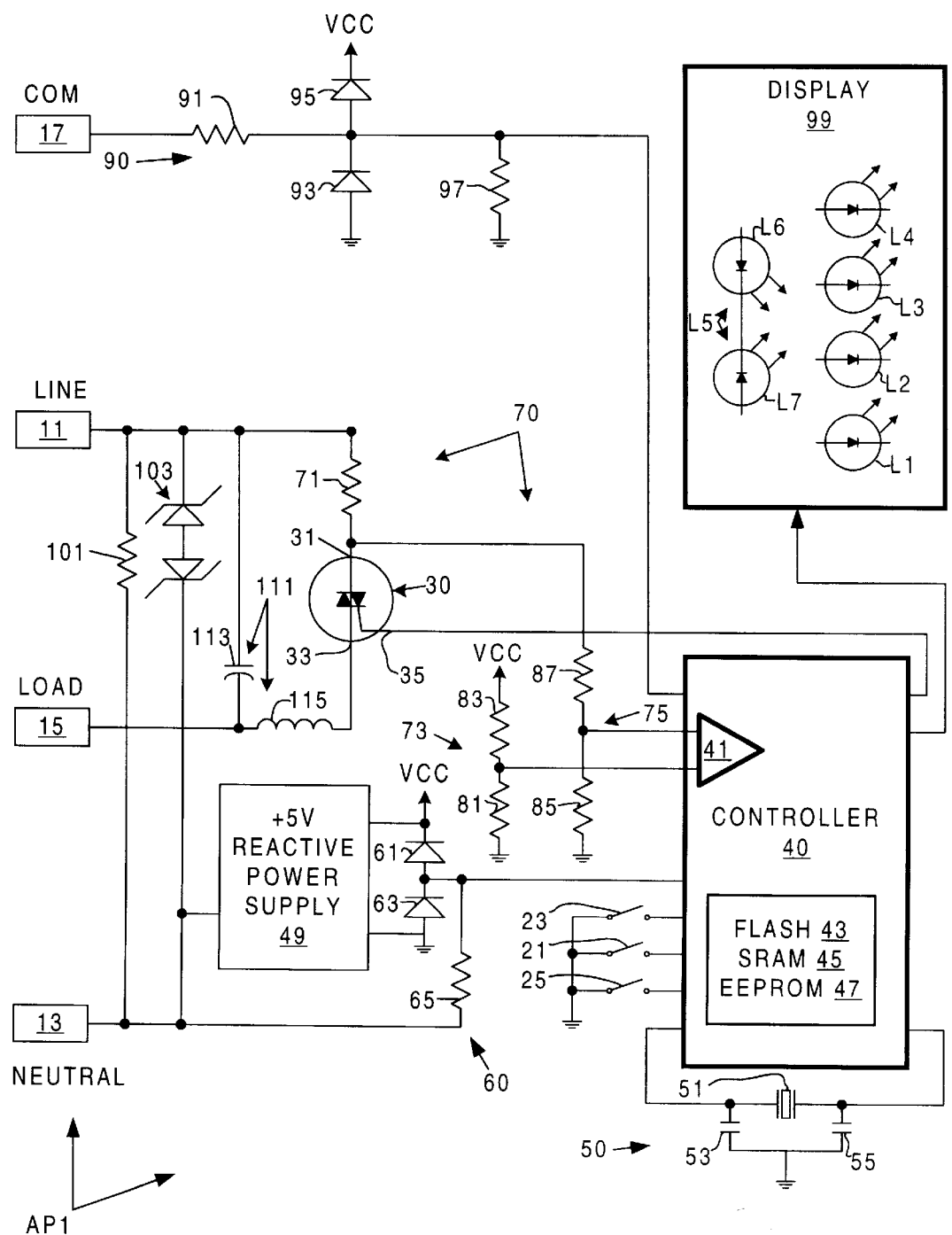
FIG. 1 is a circuit diagram of a thyristor-based FPC AC power-control system in accordance with the present invention.

An FPC AC power-control system AP1 in accordance with the resent invention includes an AC power connection 11, an AC neutral connection 13, and a load connection 15, as shown in FIG. 1. FPC system AP1 also has a digital communications input COM 17 for receiving commands. In addition, system AP1 includes three buttons: a button 21 that toggles between off and a request for a preselected power setting, a button 23 that requests a power increase, and a button 25 that requests a power decrease.

The functioning of FPC system AP1 is described with reference to the graph of FIG. 2; this graph is not to scale. One cycle of a 120-volt RMS AC voltage waveform V1 is shown extending from a first zero crossing Z1, through a second zero crossing Z2, and to a third zero crossing Z3. Between zero crossings Z1 and Z2 is a positive half cycle with a positive peak voltage P1 of 170 volts. Between zero crossings Z2 and Z3 is a negative half cycle with a negative peak voltage P2 of –170 volts.

Voltage waveform V1 produces load currents in loads coupled to AC power. Load current I1 corresponds to a load that is well within the load rating for FPC system AP1. Load current I2 corresponds to a load that is moderately over the load rating. Load current I3 corresponds to a current that can occur in the event of a short circuit between load connection 15 and neutral connection 13.

Most of the time FPC system AP1 is on, the average RMS voltage delivered to a load is responsive to user input via buttons 21, 23, 25, and communications input 17. Full voltage is delivered when AC power is coupled to the load for each entire half cycle. Half of the available RMS voltage is delivered when AC power is coupled to the load for approximately 37% of each half cycle. For each half cycle, a greater conduction angle, i.e., a longer conduction duration before the following zero crossing, results in more RMS voltage being delivered to the load.

Excessive current can damage FPC system AP1. According, it is necessary to detect overload conditions, such as the excursion of load current I2 above a threshold current level ITH. In the event such an excursion is detected, power coupling to the load can be terminated or reduced by adjusting the trigger phase angle closer to the next zero crossing.

However, the peak current in the event of a short circuit can damage FPC system AP1 in as brief a time as a single half cycle, as indicated by the excursion of short-circuit current I3 above non-repetitive overload current level INR. (In practice, current level INR can be an order of magnitude greater than threshold current ITH). Damage due to such a short-circuit current is most likely to occur on the first activation of an FPC system after a faulty installation in which the load connection and the neutral connection are shorted.

A failure at activation due to a short circuit is avoided by FPC system AP1 by connecting the load to AC power sufficiently after voltage peak P1 that a resulting short-circuit current is below non-repetitive overload current level INR. However, the connection is also sufficiently early that threshold current level ITH is crossed, providing a indication of a short circuit. In FIG. 2, triggering occurs at a phase φTT. After a brief transition, a peak PTT is reached along short-circuit current waveform I3. This peak PTT is between threshold current level ITH and non-repetitive overload current INR, so the short circuit is detected, but the system is not damaged. The short-circuit detection can be indicated to a user so that corrective action can be taken.

The power delivered to a load is controlled by the status of a triac 30 located between AC power connection 11 and load connection 15. Triac 30 is a BTG16 triac available from STMicroelectronics having U.S. headquarters in Carrollton, Tex. See STMicroelectronics Data Sheet, "BTA16-xxxSw BTB16-xxxSW High Performance Logic Level Triacs", May 1999. This triac can be controlled by common logic-level voltages, yet can handle high inrush currents. It has a repetitive current rating of 16 amps RMS, and a non-repetitive current rating of 170 amps RMS.

Triac 30 has a terminal 31 coupled to AC power connection 11 and a terminal 33 coupled to load connection 15. Triac 30 also has a trigger input 35. If a trigger signal is received at trigger input 35 while a voltage is applied across terminals 31 and 33, current flows between power connection 11 and load connection 15 until the next current zero crossing.

Trigger signals are provided to thyristor 30 by controller 40, which thus determines the trigger phase and conduction angle for thyristor 30. To ensure a fast slew rate for the trigger pulse, multiple controller pins can be connected to trigger input 35, or the trigger input can be buffered.

Controller 40 is an AT90S2313 microcontroller available from Atmel, Inc., San Jose Calif. This is an eight-bit RISC processor that includes an analog comparator 41, flash ROM 43 for storing program instructions, SRAM 45 for data manipulation, and EEPROM 47. EEPROM 47 is particularly useful in preserving settings, e.g., the most recent operating level and/or a default operating level, that need to be restored after shutdown or a power failure.

Logic-level voltages for controller 40 and other system components are derived from AC power by a reactive power supply 49. Reactive power supply 49 conventionally includes the following unillustrated components: a series resistor to limit inrush current, a series blocking capacitor acting as an impedance at power line frequencies, a half-wave rectifying diode, and a Zener diode to provide the desired voltage level, in this case +12V. A standard voltage regulator converts this to a stable +5V, which "rides" on the AC line. Circuit common is thus always −5V from the AC line. Due to the topology of reactive power supply 30, the control electronics are not influenced by electrical noise on the AC lines; such noise simply shifts VCC and ground up or down with respect to earth ground, while having no effect on the +5V DC supply.

To determine a trigger phase angle, controller 40 must determine the phase of the AC voltage waveform relative to a time base. The time base is provided by 2MHz oscillator 50, which includes a ceramic resonator 51 and two capacitors 53 and 55 in a conventional arrangement with controller 40.

AC voltage zero-crossings are detected by zero-cross detection circuitry 60, which includes a pair of diodes 61 and 63, and a pull-down resistor 65. Diodes 61 and 63 are in series between VCC and circuit-common ground. During a positive voltage half cycle, the voltage between diodes 61 and 63 is positive. During a negative voltage half cycle, the voltage between diodes 61 and 63 is pulled down to circuit-common ground through pull-down resistor 65. The resulting waveform F1, shown in FIG. 2, is input to controller 40, which thus can detect zero crossings and distinguish positive versus negative half-cycles. To trigger at phase $\phi TT$, controller 40 detects a positive-going zero crossing, and then counts controller clock cycles up to a number corresponding to phase $\phi TT$.

To determine phase $\phi TT$, a short-circuit resistance threshold is selected. This short-circuit threshold should be well between the maximum resistance expected to be associated with a short-circuit and the minimum resistance expected to be associated with a cold load that, when warm, is within the repetitive current rating for FPC system AP1.

Triac 30 is rated to handle 16 amps RMS (about 23 amps peak) under ideal conditions, including an infinite heat sink. Heat dissipation is far more limited in a typical wall-box dimmer installation. In the illustrated embodiment, the threshold current is set at 8.25 amps peak; this corresponds roughly to a 700-watt load. The dimmer is then rated safely below this, for example at 600 watts.

The operating resistance of a resistive load can be calculated from the power rating for a 120V AC power system as 14,400 ohm-watts divided by the power rating in watts. A 600-watt load has an associated operating resistance of about 24Ω. When cold, the load resistance for an incandescent load can be $\frac{1}{15}$ the associated operating resistance. For a 600-watt load, the cold-load resistance is about 1.6Ω.

A threshold short-circuit resistance is chosen to be below this minimum cold-load resistance, but above the resistance associated with an actual short circuit. The cumulative resistance of the wiring, assuming 12 or 14 gauge wiring, is not generally a factor unless the most remote location for the short is hundreds of feet away from the dimmer. In the present case, choosing a short-circuit resistance to be $\frac{3}{4}$ the maximum cold load resistance allows a cold load to be readily distinguished from a short circuit. For a 600-watt rated dimmer, the short-circuit resistance can be set at 1.2Ω.

The voltage for yielding the overload current of 8.25 amps, given the short-circuit resistance of 1.2Ω, is about 10V. Given the sinusoidal shape of the 120VRMS AC power supply, the AC voltage has fallen to 10V at the phase $\phi = \arcsin{^{10}\!/_{170}} = 3.4°$ before zero-crossing.

This is the phase angle at which the short-circuit-test trigger pulse is to reach its peak current. Since the peak is not reached instantaneously, the actual trigger phase must precede the peak. The amount of precedence must take into account series inductances such as inductor 111, as well as any inductances inherent in the triac and drive circuitry 30 themselves. In practice, the trigger phase is on the order of 0.1° before the peak phase.

Given a 60Hz AC cycle, the phase angle at which peak current is reached corresponds to 155 microseconds before the next zero crossing. An additional 5 microseconds can be added for the transition from the trigger time to the peak. Accordingly, the trigger time can be 160 microseconds before the next zero crossing. To avoid triggering in the next half cycle, the trigger signal should be completed well before the next zero crossing. For controller 40, which operates on a 2MHz clock, this is easily accomplished. For example, the trigger pulse from controller 40 can have a 10-microsecond duration.

Figure 2:
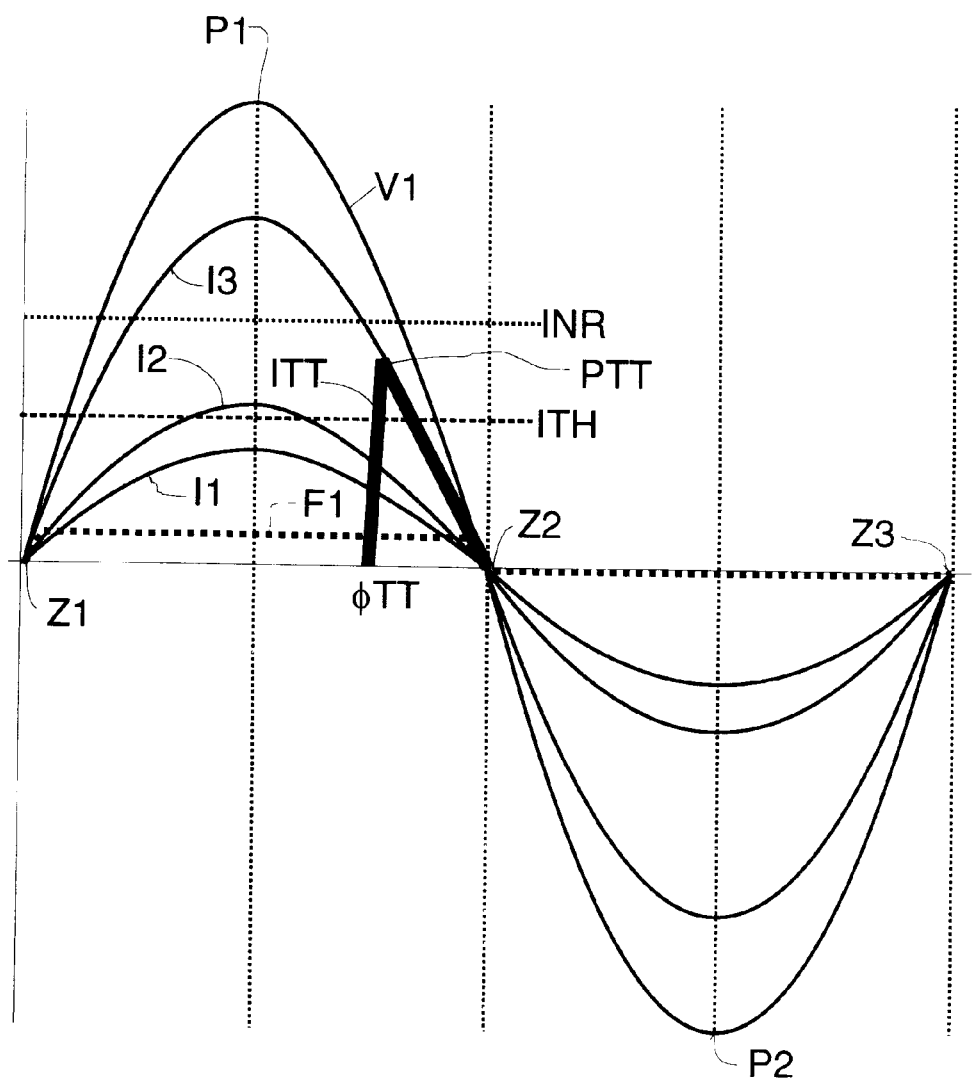
FIG. 2 is a graph of a voltage cycle showing a short-circuit-test trigger phase for the FPC system of FIG. 1.

The short-circuit-trigger pulse, when issued, results in a brief current pulse such as ITT in FIG. 2. The short-circuit determination depends on whether or not its peak PTT exceeds current threshold ITH. This determination is made using overload detection circuitry 70, comprising a sense resistor 71, voltage dividers 73 and 75, and comparator 41. (Comparator 41 is structurally integrated with controller 40, but functionally part of overload detection circuitry 70.) "Reference" voltage divider 73 includes resistors 81 and 83, while "scaling" voltage divider 75 includes resistors 85 and 87.

Sense resistor 71 is in series with triac 30 and therefore must be able to carry the same range of currents. The resistance of the sense resistor should be quite small to limit heat dissipation. Conveniently, the sense resistor can be a copper trace, e.g., on a PCB board. The resistance can be on the order of 0.02Ω.

One potential problem of such a trace resistor is that its resistance can vary with temperature. However, since the trace resistance is low, the temperature of the trace resistor does not vary much. In the case of the short-circuit test, the trace resistor is generally cold-so temperature variations are not a concern for the short-circuit test. It is, however, within the scope of the invention to allow the short-circuit current threshold to differ from the overload-current threshold for steady-state operation, thus taking into account temperature-related variations in the resistance of a trace sense resistor.

Comparator 41 compares two voltages, one of which is a reference voltage and the other is a function of the thyristor current. While depicted as a separate component, comparator 41 can be an integral part of controller 40. Integrated analog comparators tend to be more precise near the middle of their operating voltage range. Accordingly, the reference voltage is set within the middle of the operating range of comparator 13. Voltage divider 73 is designed to establish the reference voltage in this range. This is readily accomplished by having equal resistances for resistors 81 and 83 so that the reference voltage is 2.5V. Using a common resistance reduces the number of different types of components required for assembling FPC system AP1, thus reducing manufacturing costs.

Voltage divider 75 is designed to scale the voltage generated across sense resistor 71 so that it equals the reference voltage when the thyristor current equals the threshold current. Establishing this equality is critical to the effectiveness of overload protection. In general, careful experimentation with these resistances during FPC system design is required to ensure that proper current thresholding. To minimize manufacturing costs, resistor 85 can have the same specifications as resistors 81 and 83, so it can be a 10kΩresistor. The resistance of resistor 87 then determines the scaling of the thyristor current and thus determines threshold current ITH. In the present case, the resistance of resistor 87 is 9.34kΩ.

If during a short-circuit-test cycle, thresholding circuitry indicates that current threshold ITH is exceeded, controller 40 withholds further triggers from thyristor 30. If the short-circuit test does not result in an overcurrent detection, normal operation is begun. Normal operation includes request-responsive operation and warm-up.

During request-responsive operation, FPC system AP1 responds to user inputs via buttons 21, 23, and 25, as well as from communications input 17. Inputs received from communications input 17 reach controller 40 via communications path 90, which includes a current limiting resistor 91, voltage-limiting diodes 93 and 95, and a pull-down resistor 97.

In system AP1, the transition from short-circuit-test phase angle $\phi$TT and a phase angle required to provided the requested power is gradual. Depending on the difference between $\phi$TT and the request phase angle, the transition can take up to half a second, or longer if a visible fade-up is desired. The gradual transition is generally known as a "soft start". Soft starts extend the operating life of incandescent lamps, which can fail when filaments are broken by the shock of the magnetostrictive forces of sudden cold ignitions.

Moreover, since an incandescent lamp can draw about fifteen times more current when cold than when warm, a load nominally within a triac's specifications can cause overload damage before it is warmed up. The gradual transition allows the load to warm up before the full requested voltage is supplied. If an overload is detected during warm up, it is still possible that the load will not cause an overload when at thermal equilibrium. Thus, if an overload is detected during warm up, the conduction angle over which the power delivered can be reduced. If the requested phase angle cannot be achieved within half a second without causing an overload current, controller 40 keeps thyristor 30 off. Recurrent overloads detected during request-based operation also result in shutdown.

Controller 40 indicates the status of FPC system AP1 on display 99, which comprises LEDs L1, L2, L3, L4 and L5. Green LEDs L1–L4 are arranged as a four-segment bar graph. LED L1, when illuminated, indicates that a low level of voltage (as determined by the trigger phase angle) is being delivered to the load. LED L2 indicates when the voltage is between one quarter and one-half of full. L3 indicates when the voltage is between one-half and three-quarters of full. L4 indicates when the voltage is greater than three-fourths of full.

LED L5 is a tri-color LED comprising a red LED L6 and a green LED L7 in a common cathode arrangement. If FPC system AP1 is off, but DC is connected to controller 40, only red LED L6 is illuminated, providing a continuous red "ready" indication. If power is being delivered to a load, only green LED L7 is illuminated, providing a green "on" indication. If FPC system AP1 is off in response to a short-circuit-test failure, red LED L6 provides a flashing "short-circuit" indication. If FPC system is off in response to a non-short-circuit-test failure, both red LED L6 and green LED L7 are flashed to provide a flashing yellow "overload" indication.

Figure 3:
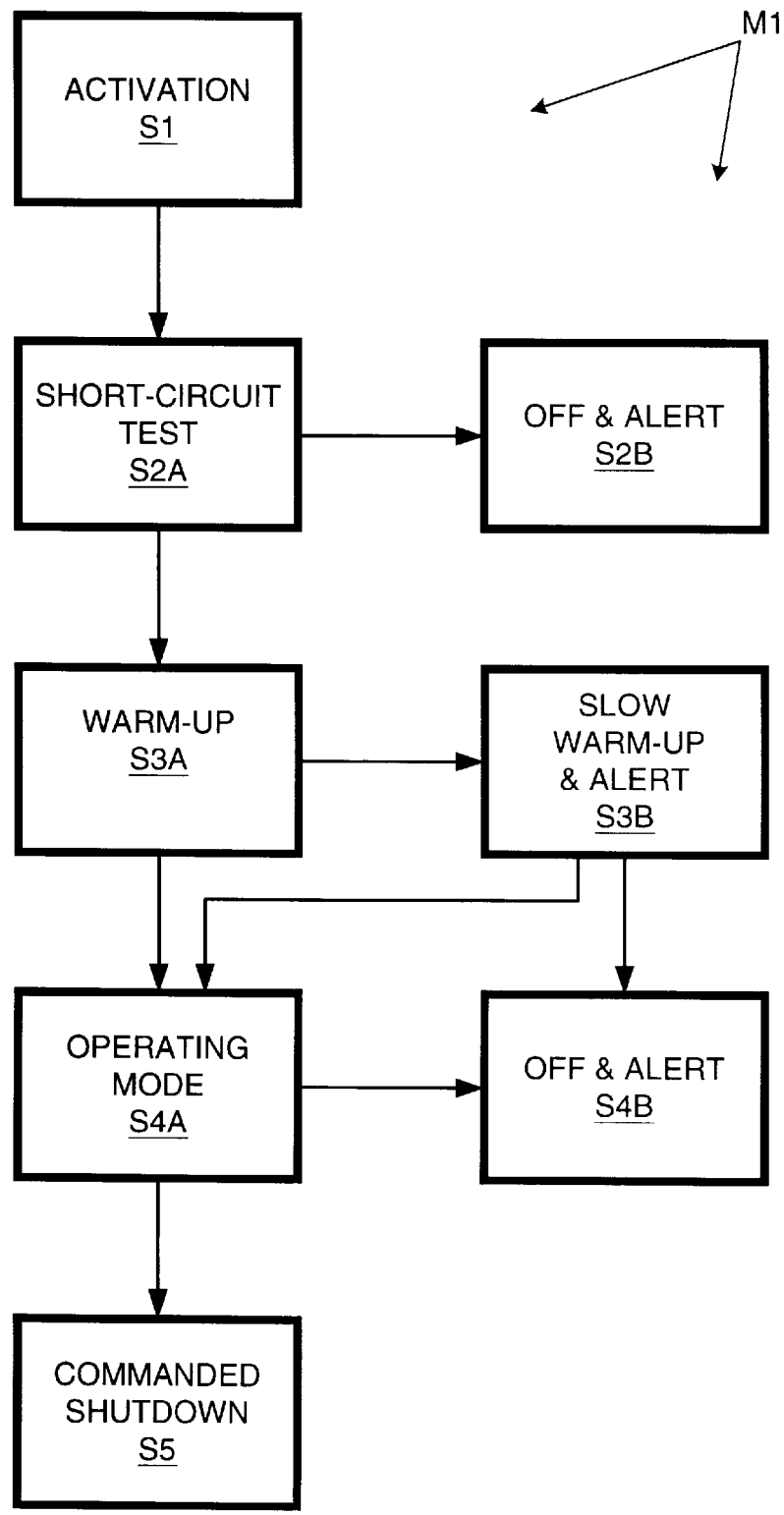
FIG. 3 is a phase-by-time graph for the power-control system of FIG. 1.
Figure 4:
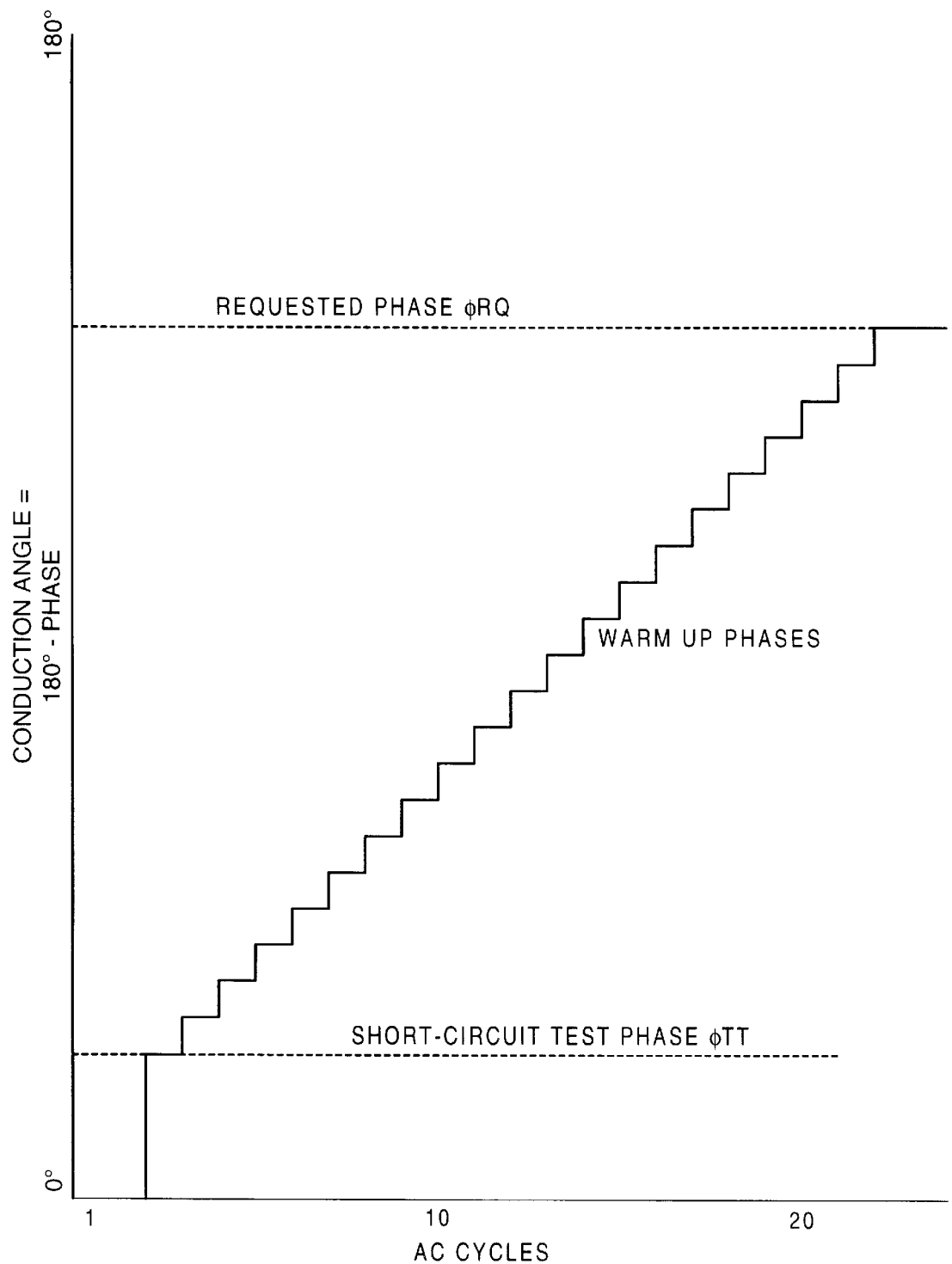
FIG. 4 is a flow chart of an FPC method in accordance with the present invention practiced in the context of the power-control system of FIG. 1.

A method M1 of the invention is flow charted in FIG. 3. At step S1, FPC system AP1 is activated. This normally involves depression of button 21, which activates system AP1 and requests a preselected power level. In this case, the preselected power level corresponds to a requested phase angle $\phi$RQ, indicated in the graph of FIG. 4.

A short-circuit test is performed at step S2A, FIG. 3. Controller 40 uses zero-cross detection circuitry 60 and oscillator circuitry 50 to track the phase of the AC line voltage. Once a zero crossing is detected, controller 40 triggers triac 30 at short-circuit test phase angle $\phi$TT, indicated in FIG. 4 as well as FIG. 2. This results in a current ITT (FIG. 2) through triac 30.

The sense voltage resulting from this triac current is scaled by voltage divider 75 and compared with the reference voltage by comparator 41 to determine if threshold current ITH is exceeded. If threshold current ITH is exceeded, the short-circuit test results in a failure and method M1 proceeds to step S2B; if the threshold current ITH is not exceeded, the short-circuit test is passed and method M1 proceeds to step S3A.

If a short circuit is detected at step S2A, controller 40 ceases triggering of triac 30. In addition, a short-circuit indication is displayed at display 99, by flashing red LED L6 so that tricolor LED L5 flashes red.

If no short circuit is detected at step S2A, controller 40 proceeds with a gradual adjustment of the trigger phase at step S3A to allow the load to warm-up before the default power is delivered. This gradual "soft-start" transition is indicated by the stair steps in the graph of FIG. 4.

Since an incandescent lamp can draw about fifteen times more current when cold than when warm, a load nominally within a triac's specifications can cause overload damage before it is warmed up. If an overload is detected during warm up, it is still possible that the load will not cause an overload when at thermal equilibrium. Thus, if an overload is detected during warm up, the conduction angle over which the power is delivered is reduced at step S3B.

The warm up is thus operated at closed loop for a fixed duration of three seconds. If the preselected power level is not achieved by the end of this period, the warm up "fails". In this case, method M1 proceeds from step S3B to step S4B, voltage is no longer supplied, and tricolor LED L5 flashes yellow.

If the warm-up, either in step S3A or step S3B reaches the requested power level, a request-responsive operating mode is entered at S4A. If, while in this mode, a request for a new power level is received, either via buttons 23 or 25, or communication input 17, the adjustment can be immediate. The power level is indicated by the one of LEDs L1–L4 that is illuminated. This request-based operation continues either until shutdown, at step S5, or until an overload is detected.

An overload during request-responsive operation can represent: 1) an over-rated load; 2) the addition of a cold load while a parallel load is already operating in a request-based mode; or 3) the introduction of a short circuit during request-responsive operation. In the latter unlikely case, the invention does not necessarily protect the thyristor from damage. In the event of a recurring overload (e.g., overload detections in five consecutive positive half cycles) during request-responsive operation, method M1 proceeds to step S4B, triggering of triac 30 ceases, and tricolor LED L5 displays a yellow overload warning.

In the illustrated embodiment, the current threshold is used for both overload protection during normal operation and for short-circuit protection during the short-circuit test.

The current rating determines the threshold for normal operation, so this threshold is a given for the short-circuit test. Thus, the test trigger phase angle is selected as a function of the threshold current.

FPC system AP1 includes a capacitor-discharge resistor 101 for discharging a capacitor internal to power supply 49 for safety. FPC system AP1 also includes a voltage-surge protection MOV 103 between line and neutral. In addition, an LC filter 111 including a capacitor 113 and an inductor 115 reduces high frequency switching components generated by the phase-controlled power.

Relative to phase control systems that monitor current using a multi-bit analog-to-digital converter, the thresholding of the present invention is a cost-effective method of overload protection. Despite its simplicity, it can be used to acquire information beyond a simple criterion being met or not met. In particular, the portion of a half-cycle in which the current is over threshold is readily determined by the microcontroller. This duration can be taken as a measure of the extent of the overload. A brief overload might suggest a small reduction in conduction angle, while an extended overload might suggest a shutdown.

Furthermore, in some cases, the current waveform may "ring" about the current threshold. In other words, the current may cross the threshold multiple times in a voltage half cycle. This ringing may reflect a reactive load. In any event, the timings of threshold crossings can provide additional information that is useful in selecting a course of action to address an overload condition.

In the preferred embodiment, the current parameter sensed is current itself. In an alternative embodiment, the current parameter is the magnitude of the rate of change of current. This embodiment senses the voltage drop across an inductor such as inductor 115. This sense voltage is input to an appropriately modified version of voltage divider 75. The short-circuit criterion then requires that the magnitude of the rate of change of current exceed a threshold value during at least one short-circuit-test cycle. This embodiment can still employ a sense resistor such as resistor 71 for general overload detection.

The foregoing provides a detailed description of a single embodiment of the invention. Other embodiments may have different threshold currents, resistor values, user input means, displays, or semiconductor power switches (e.g., SCRs instead of triacs) etc. Some simplification can be obtained by using a programmable counter as a controller. These and other variations upon and modifications to the disclosed embodiments are provided for by the present invention, the scope of which is defined by the following claims.

What is claimed is:

1. A system for controlling AC power delivery to a load, said AC power defining an AC voltage, said AC voltage defining a series of AC voltage cycles, each of said AC voltage cycles having zero crossings, said system comprising:

an activation input for receiving an activation signal;

a switch for selectively coupling a load to AC power, said switch having a switch-control input, said switch in normal condition coupling said load to AC power in response to a coupling command received at said switch-control input;

threshold circuitry for detecting when a current-parameter value of a current parameter associated with a current through said load exceeds a threshold value, said threshold circuitry including a sensor for sensing said current parameter;

phase tracking means for determining the phase of said AC voltage; and a controller for controlling said switch by sending said coupling command to said switch-control input, said controller in response to receiving said activation signal leaving said load uncoupled from AC power during the first half of a voltage half cycle and then sending at least a first coupling command to said switch at a short-circuit-test phase angle within the second half of said half cycle, said controller being coupled to said phase tracking means, said controller determining whether or not a short-circuit criterion is met, said short-circuit criteria requiring that said current-parameter value exceed said threshold value during at least one short-circuit-test AC voltage cycle, said controller withholding coupling commands during succeeding voltage cycles if said short-circuit criterion is met.

2. A system as recited in claim 1 wherein said switch is a thyristor.

3. A system as recited in claim 1 further comprising an output for indicating a short circuit, said output being coupled to said controller, said controller causing said output to indicate a short circuit when said short-circuit criterion is met.

4. A system as recited in claim 1 wherein said short-circuit test phase is less than one-twelfth cycle before one of said zero crossings.

5. A system as recited in claim 1 wherein said current-parameter is current magnitude.

6. A system as recited in claim 1 wherein, if said short-circuit criterion is not met, said controller triggers said switch at post-short-circuit-test phase angles that provide greater conduction angles than does said short-circuit test phase angle.

7. A system as recited in claim 6 wherein said controller determines whether or not an "overload" criterion is met during post-short-circuit-test voltage cycles, said overload criterion requiring that said current-parameter-value exceed said threshold value during at least one post-short-circuit-test voltage cycle.

8. A system as recited in claim 7 further comprising:

a short-circuit indicator for providing a short-circuit indication when said short-circuit criterion is met, said short-circuit indicator being coupled to said controller; and an overload indicator for providing an overload indication when said overload condition is met, said overload indicator being coupled to said controller, said overload indication being distinct from said short-circuit indication.

9. A method of controlling the power delivered to a load from an AC power source, said method using forward phase control, said method comprising the steps of:

receiving an activation command;

during a short-circuit-test voltage half cycle, leaving said load uncoupled from said AC source during a first half of said half cycle and then triggering a switch so as to couple said load to said AC power source at a short-circuit-test phase during a second half of said half cycle;

determining whether a resulting current-parameter value of a current parameter associated with a current through said load during a short-circuit-test voltage cycle exceeds a threshold value;

determining whether a short-circuit criterion is met, said short-circuit criterion requiring at that said threshold value be exceeded during at least one short-circuit-test voltage cycle; and if said short criterion is met, not coupling said load to said AC power source during immediately subsequent voltage cycles.

10. A method as recited in claim 9 wherein said switch is a thyristor.

11. A method as recited in claim 9 further comprising providing a human-readable output indicating that said short-circuit criterion is met.

12. A method as recited in claim 9 wherein said short-circuit test phase is less than one-twelfth cycle before said voltage zero crossing.

13. A method as recited in claim 9 wherein said current parameter is current magnitude.

14. A method as recited in claim 9 further comprising a step of triggering said switch in subsequent post-short-circuit-test voltage cycles at a phase that provides a greater conduction angle than does said short-circuit-test phase.

15. A method as recited in claim 14 further comprising a step of determining whether a post-short-circuit-test overload condition is met, said overload condition requiring that said current-parameter value exceed said threshold value during at least one non-short-circuit-test voltage cycle.

16. A method as recited in claim 15 further comprising the steps of:

if said short-circuit condition is met, providing a human-readable short-circuit indication that said short-circuit condition is met; and if said overload condition is met, providing a human-readable overload indication that said overload condition is met, said overload indication being distinct from said short-circuit indication.

\* \* \* \* \*